Nov. 20, 1956 S. DARVIE 2,771,083
RETRACTABLE MIRROR DEVICE
Filed July 19, 1955
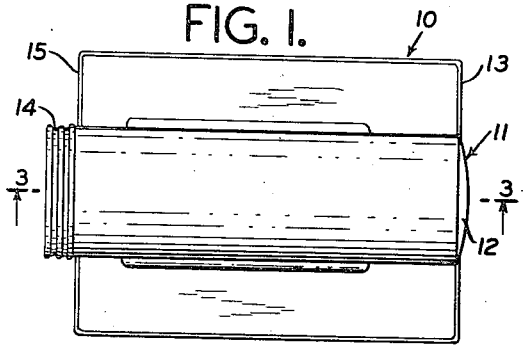
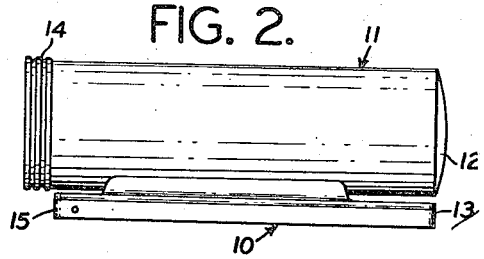
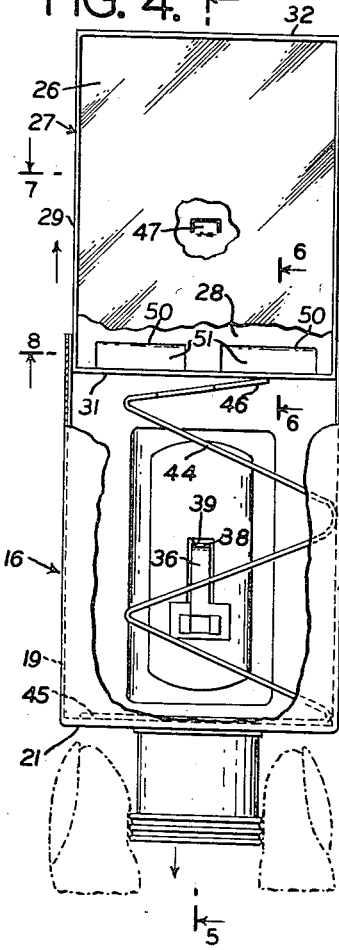
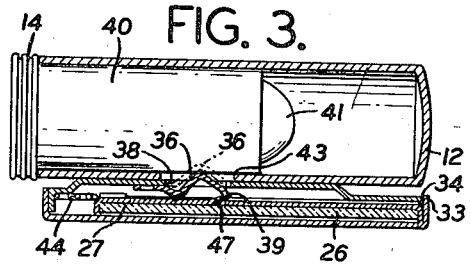
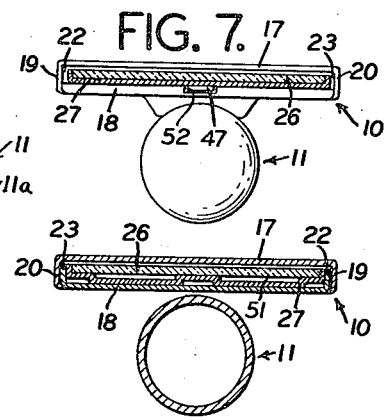
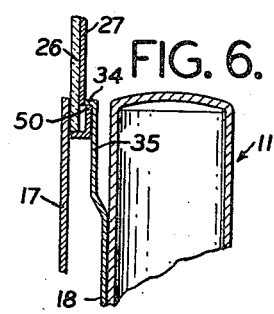
INVENTOR
SAMUEL DARVIE.
BY
ATTORNEY.

United States Patent Office 2,771,083
Patented Nov. 20, 1956

2,771,083

RETRACTABLE MIRROR DEVICE

Samuel Darvie, New York, N. Y., assignor to Elegante Accessories, Inc., New York, N. Y., a corporation of New York Application July 19, 1955, Serial No. 522,904

8 Claims. (Cl. 132—79)

This relates to a combination casing and mirror—more particularly, although not exclusively, to a unitary device comprising a lipstick holder and retractable mirror.

It is primarily within the contemplation of my invention to provide a device of the above-mentioned category in which a normally concealed and protected mirror is automatically released for movement into its operative or visible position by the partial retraction or complete removal of a lipstick member from a container associated with the mirror. And it is a further complementary object to enable said lipstick member, when disposed within its container, to hold the mirror in its retracted position.

Another object of my invention is to enable the said lipstick member to serve as convenient manual holding means whereby the exposed mirror can conveniently be maintained in unobstructed viewing position. And in this aspect of my invention it is another object thereof to provide a compact device having the features above-mentioned, whereby the lipstick member is disposed behind the mirror and the housing therefor, so as to be in non-obstructing relation to said mirror.

It is further within my contemplation to provide a relatively simple and inexpensive structure having the advantages and features hereinabove set forth.

Other objects, features and advantages will appear from the drawings and the description hereinafter given.

Referring to the drawings,

Figure 1 is a rear view of one embodiment of my invention, with the mirror in its retracted position and the lipstick member within its container.

Figure 2 is a side view of Figure 1.

Figure 3 is a section of Figure 1 taken along line 3—3.

Figure 4 is a front view of the device of Figure 1, showing the mirror in its exposed projected position, the lipstick member being shown partly withdrawn by fingers illustrated by dot-dash lines, fragments of the structure being removed for clarity.

Figure 5 is a section of Figure 4 taken substantially along line 5—5.

Figure 6 is a fragmentary section of Figure 4 taken substantially along line 6—6.

Figure 7 is a section of Figure 4 taken along line 7—7.

Figure 8 is a section of Figure 4 taken substantially along line 8—8.

Referring to the embodiment of my invention illustrated in the drawings, the mirror components is generally designated by the reference numeral 10, and the cosmetic component by the reference numeral 11—the latter being disposed behind the former. When the device is in its closed inoperative position, as illustrated in Figures 1 to 3, almost the entire lipstick component is hidden when the device is viewed from the front, the crown 12 thereof being visible from the top 13 of the mirror component, and the lipstick grip 14 protruding beyond the bottom 15 of the mirror component, whereby it may conveniently be grasped.

The mirror component comprises a housing generally designated 16, the particular structure thereof disclosed in the drawing comprising an outer front casing 17 and an inner rear casing 18, the side flanges 19 and 20 of the former and the bottom flange 21 thereof overlapping the corresponding side flanges 22 and 23 of the latter and the bottom flange 24 thereof, respectively. The arrangement is hence such as to provide an inner compartment 25 proportioned and adapted to slidably receive therein the mirror 26 and its supporting frame structure 27. The latter comprises a rear wall 28, side flanges 29 and 30, bottom flange 31, and top flange 32, the latter being bent back upon itself to produce the overhanging lip 33 positioned and proportioned to engage the narrow top flange 34 of said inner casing 18 when the mirror-frame component is in its retracted position, as illustrated in Figure 3.

Preferably punched out of rear panel 35 of said inner casing 18 is the rearwardly bent tongue 36, this being of resilient material, said tongue serving as a spring catch, as will hereinafter appear. Said catch 36 has a rearwardly extending substantially V-shaped portion with an apical portion 37 protruding through the opening 38 in said panel 35; and it also has an upper forwardly extending terminal lip 39. As will more clearly hereinafter appear, said catch 36 is adapted to be actuated by the lipstick member associated with said grip 14, for both retaining the mirror 26 within the housing 16, and releasing it for projection into its exposed position.

The said lipstick component 11 comprises a container 11a attached, by any suitable means known to those skilled in the art—such as by soldering, brazing or known mechanical means—to the rear panel 35 of said housing 16. Slidably disposed within container 11a is the lipstick holder 40 supporting therein, in known manner, the lipstick 41. The forward portion of container 11a contains an aperture 42 in substantial registry with the said opening 38 of said panel 35.

The said spring catch 36 is formed and positioned so that it is adapted normally to extend rearwardly through said opening 38 and aperture 42, said apical portion 37 being disposed in the longitudinal operative path of the lipstick holder 40, as indicated in Figure 5, and also by the dot-dash representation 36 in Figure 3. When said lipstick holder 40 is operatively moved upwardly into its closed position (illustrated in Figure 3) the upper rear portion 43 of holder 40 engages the said apical portion 37 of the spring catch and urges it forwardly to the full-line position of Figure 3. In this position said terminal lip 39 is disposed in the path of the rear wall 28 of frame 27.

Disposed within the said compartment 25 is the accordion spring 44, the bottom portion 45 of which rests upon flange 24 of the inner casing 18, and the upper portion 46 of said spring rests against the bottom flange 31 of the mirror frame 27. The said spring 44 normally urges the mirror 27 and its said supporting frame 27 to the upper limiting position shown in Figure 4, said spring being compressed to its contracted position when the mirror 26 and its said supporting frame are operatively disposed in their retracted position shown in Figure 3.

Disposed intermediate the marginal portions of wall 28 of said mirror frame 27, and extending rearwardly therefrom, is the rearwardly protruding lug 47. In the particular construction illustrated, said lug is punched outwardly from said wall 28, whereby the upper edge 48 of said punched-out portion is directed upwardly. Said lug 47 is so positioned that, when the mirror component is in its said lowered and retracted limiting position, it is disposed directly below the said terminal lip 39 of catch 36. Inasmuch as lug 47 is inclined upwardly and rearwardly, as illustrated, it will be able to slidably engage lip 39, during the downward operative movement of the mirror member, and move to its lower limiting position, illustrated in Figure 3. In this position, under the influence of spring 44, the said upper edge 48 of lug 47 is in engagement with the lip 39, the latter preventing any upward movement of the mirror member 26 and its frame 27 until said catch 36 is operatively permitted to retract from its holding position of Figure 3 to its retracted position of Figure 4.

Such operative movement of catch 36 between its two limiting positions is effected, as aforesaid, by the movement of lipstick holder 40. When the lipstick is fully housed within container 11a, the front wall 49 of holder 40 engages the rearmost crest 37 of latch 36, pressing it into its forward limiting or locking position. As soon as the lipstick holder 40 is retracted, either fully or to a position where the holder 40 is no longer in engagement with the latch 36, the latter will yieldably move to its rear retracted position illustrated in Figure 5. When this occurs the spring 44 will urge the mirror 26 and its said frame 27 into its upper limiting position.

The last-mentioned position is determined by the level of contact between the said upper flange 34 of the housing 16 and the upper edges 50 of the two punched-out tongues 51 at the bottom of panel 28 (Figures 4 and 6). In other words, when the mirror member is actuated upwardly by the spring 44 and reaches the position where the said edges 50 engage flange 34 of inner casing 18, the mirror will be held against further upward movement, and will also be prevented from being completely ejected from the housing 16. It will also be observed that said flange 34 contains a recessed portion 52 proportioned and positioned to permit the said lug 47 to move therepast during the upward travel of the mirror member.

It is thus apparent that by the structure of my invention, the lipstick holder 40 normally keeps the mirror in its retracted position within housing 16. In this position not only is the mirror concealed from view, but it is also fully protected by the front wall 53 of casing 16. By the simple operation of removing the lipstick holder 40, the mirror is caused, in the manner aforesaid, to be actuated upwardly to its fully exposed position. In other words, when the lipstick is to be applied upon its withdrawal from the container 11a, the mirror automatically springs up into its exposed position, whereby the lipstick can be applied by the operator while using the exposed mirror. To return the device to its inoperative position, all that need be done is to apply pressure upon the top of the mirror, whereby it will slidably move downwardly against the action of spring 44; and while holding the mirror in its said retracted position, the lipstick holder 40 is operatively inserted. When this is done, the mirror will be operatively retained in its retracted position, in the manner above described.

It will further be observed that while the mirror is in its exposed position, it is entirely unobstructed, first because the said tongues 51 are disposed at the bottommost position of the mirror frame 27, and second because the entire lipstick component 11 is disposed behind the mirror in nonobstructing relation to the face thereof. And it will be further noted that because the grip 14 of holder 40 extends below the edge 15 of the mirror component 10, it is available for ready and convenient grasping.

In the above description, the invention has been disclosed merely by way of example and in preferred manner; but obviously many variations and modifications may be made therein. It is to be understood, therefore, that the invention is not limited to a specific form or manner of practicing same, except insofar as such limitations are specified in the appended claims.

I claim:

1. In a combination retractable mirror and lipstick holder, a mirror movable between projected and retracted limiting positions, a housing therefor, spring means normally urging said mirror into its said projected limiting position, an open portion at the rear of said housing, a spring catch disposed in said open portion and having a forwardly extending lip proportioned to extend into said housing and a rearwardly extending portion protruding rearwardly from said housing, a lipstick holder behind said housing and movable along a path intercepting said rearwardly extending portion, said holder being slidably engageable with said rearwardly extending portion to yieldably urge said catch forwardly to a predetermined locking position, a container attached to the rear of said housing and slidably accommodating therein thereof an aperture in substantial registry with said open said holder, said container having in the forward portion portion of said housing, a lug at the rear of said mirror and positioned in the path of said lip when said catch is in said locking position, said lip being positioned above said lug when the mirror is in its said retracted position, said spring catch being yieldably held in a rearwardly retracted position when operatively out of engagement with said actuating member, said lip being out of the path of said lug and said rearwardly extending portion of the catch protruding rearwardly through said aperture in said container when the catch is in its said retracted position.

2. In a combination retractable mirror and lipstick holder, the combination according to claim 1, said lipstick holder having a grip portion disposed below said casing.

3. In a combination retractable mirror and lipstick holder, the combination according to claim 1, said rearwardly extending portion of said spring catch being substantially V-shaped with its rearmost apical portion operatively engageable with said lipstick holder.

4. In a combination retractable mirror and lipstick holder, the combination according to claim 1, said rearwardly extending portion of said spring catch being substantially V-shaped with its rearmost apical portion operatively engageable with said lipstick holder, said lip being at the upper terminal portion of the catch, the said lug on the mirror extending rearwardly and upwardly, the upper edge of said lug being in engagement with said lip when the mirror is in its said retracted position.

5. In a combination retractable mirror and lipstick holder, a mirror component movable between projected and retracted limiting positions, said component having a mirror and a frame structure therefor, the latter comprising a rear wall, side, top and bottom flanges extending forwardly from said rear wall and embracing the edges of the mirror, a lug extending rearwardly from said rear wall, a housing slidably accommodating therein said mirror component, spring means within said housing normally urging said mirror component into its said projected limiting position, an open portion at the rear of said housing, a spring catch disposed in said open portion and having a forwardly extending lip proportioned to extend into said housing and a rearwardly extending portion protruding rearwardly from said housing, a lipstick holder behind said housing and movable along a path intercepting said rearwardly extending portion, said member being slidably engageable with said rearwardly extending portion to yieldably urge said catch forwardly to a predetermined locking position, retaining means for said holder secured to the housing, the said lug being positioned in the path of said lip when said catch is in said locking position, said lip being positioned above said lug when the mirror is in its said retracted position, said spring catch beng yieldably held in a rearwardly retracted position when operatively out of engagement with said actuating member, said lip being out of the path of said lug when the catch is in its said retracted position.

6. In a combination retractable mirror and lipstick holder, the combination according to claim 5, the upper flange of said frame structure being proportioned and positioned to engage the top of said housing when said mirror component is in its said retracted limiting position, the said rear wall of the mirror frame structure having at the bottom portion thereof a rearwardly extending tongue positioned and proportioned to engage the top of said housing when said mirror component is in its said projected limiting position.

7. In a combination retractable mirror and lipstick holder, the combination according to claim 5, said spring means resting upon the bottom portion of the housing, the upper portion of said spring means being in engagement with said bottom flange of said mirror frame structure.

8. In a combination retractable mirror and lipstick holder, a mirror movable between projected and retracted limiting positions, a housing therefor comprising a front casing and a rear casing, said front casing having a front wall and marginal flanges, said rear casing having a rear wall and marginal flanges, the said flanges of said casings being in overlapping engagement and said front and rear walls being in spaced relation to provide an inner compartment, said compartment being proportioned to accommodate therein said mirror when in its retracted limiting position, spring means within said compartment and in engagement with said mirror to urge it into its said projected limiting position, an open portion in the rear wall of said rear casing, a spring catch disposed in said open portion and having a forwardly extending lip proportioned to extend into said housing and a rearwardly extending portion protruding rearwardly from said housing, a lipstick holder behind said housing and movable along a path intercepting said rearwardly extending portion, said holder being slidably engageable with said rearwardly extending portion to yieldably urge said catch forwardly to a predetermined locking position, retaining means for said holder secured to said rear wall of said rear casing, a lug at the rear of said mirror and positioned in the path of said lip when said catch is in said locking position, said lip being positioned above said lug when the mirror is in its said retracted position, said spring catch being yieldably held in a rearwardly retracted position when operatively out of engagement with said holder member, said lip being out of the path of said lug when the catch is in its said retracted position.

References Cited in the file of this patent

UNITED STATES PATENTS

| | | |
|---|---|---|
| 2,294,257 | Udvarhely et al. | Aug. 25, 1942 |
| 2,294,656 | Feib | Sept. 1, 1942 |
| 2,522,403 | Ross | Sept. 12, 1950 |